United States Patent [19]
Hirano et al.

[11] Patent Number: 5,964,810
[45] Date of Patent: Oct. 12, 1999

[54] MAP DISPLAY APPARATUS

[75] Inventors: Motoki Hirano, Tokyo; Kaoru Harada, Yokohama, both of Japan

[73] Assignee: Xanavi Informatics Corporation, Kanagawa, Japan

[21] Appl. No.: 08/660,406

[22] Filed: Jun. 7, 1996

[30] Foreign Application Priority Data

Jun. 9, 1995 [JP] Japan .................................. 7-177907

[51] Int. Cl.⁶ .................................................. G08G 1/123
[52] U.S. Cl. ............................ 701/28; 701/212; 340/995
[58] Field of Search ................................ 701/201, 208, 701/209, 212, 213, 300; 340/495, 998; 345/139, 119, 122

[56] References Cited

U.S. PATENT DOCUMENTS

| | | | |
|---|---|---|---|
| 4,667,190 | 5/1987 | Fant . | |
| 4,940,972 | 7/1990 | Mouchot et al. . | |
| 4,956,706 | 9/1990 | Ohba . | |
| 5,144,679 | 9/1992 | Kakumoto et al. ........................ | 382/1 |
| 5,161,886 | 11/1992 | De Jong et al. ........................ | 364/449 |
| 5,381,338 | 1/1995 | Wysocki et al. ........................ | 364/449 |
| 5,415,550 | 5/1995 | Aoki et al. . | |
| 5,528,735 | 6/1996 | Strasnick et al. ........................ | 395/127 |
| 5,553,208 | 9/1996 | Murata et al. ........................ | 395/125 |
| 5,555,354 | 9/1996 | Strasnick et al. ........................ | 395/127 |
| 5,566,073 | 10/1996 | Margolin ........................ | 364/449 |
| 5,671,381 | 9/1997 | Strasnick et al. ........................ | 395/355 |
| 5,732,385 | 3/1998 | Nakayama et al. ........................ | 701/201 |
| 5,742,924 | 4/1998 | Nakayama ........................ | 701/208 |
| 5,748,109 | 5/1998 | Kosaka et al. ........................ | 340/995 |

FOREIGN PATENT DOCUMENTS

| | | |
|---|---|---|
| 0 378 271 | 7/1990 | European Pat. Off. . |
| 2 634 707 | 2/1990 | France . |

*Primary Examiner*—William A. Cuchlinski, Jr.
*Assistant Examiner*—Arthur D. Donnelly
*Attorney, Agent, or Firm*—Evenson, McKeown, Edwards & Lenahan, PLLC

[57] ABSTRACT

A navigation system for vehicles comprises a read device that reads planar map data from a recording medium which stores in memory planimetric map data of a road map, a current position detection device that detects the current position of the vehicle, a storage circuit that stores in memory function tables for converting positional coordinates of nodes included in a road map area around the detected current position to positional coordinates of nodes on a bird's-eye-view map obtained by looking down upon the road map in a specific direction, at a specific look-down angle and a specific aspect angle from a viewpoint set above the vicinity of the detected current position and a bird's-eye-view map display data preparation circuit that reads out data related to coordinate positions of nodes on the bird's-eye-view map by operating the conversion table with the coordinate positions of nodes on the road map and prepares bird's-eye-view map display data for displaying the bird's-eye-view map on the monitor based upon the data thus read out.

22 Claims, 11 Drawing Sheets

Fig. 13A

| X1 |
|---|
| Y1 |
| X2 |
| Y2 |
| $g^b(E_{y1})$ |
| $f^b(E_{y1})$ |
| $g^b(E_{y2})$ |
| $f^b(E_{y2})$ |
| ⟩ |
| $g^b(E_{yn})$ |
| $f^b(E_{yn})$ |

} 2048 VALUES

Fig. 13B

| X1 |
|---|
| Y1 |
| X2 |
| Y2 |
| $g^a(E_{y1})$ |
| $f^a(E_{y1})$ |
| $g^a(E_{y2})$ |
| $f^a(E_{y2})$ |
| ⟩ |
| $g^a(E_{yn})$ |
| $f^a(E_{yn})$ |

} 1024 VALUES

MAP DISPLAY APPARATUS

BACKGROUND OF THE INVENTION

1. Field of the Invention

The present invention relates to a map display apparatus which displays a map in a bird's-eye view format and converted from a map in a plane view format.

2. Description of the Related Art

There are map display apparatuses for vehicles in the prior art that display a road map on a display device in the so called bird's-eye view display format, whereby a road map in the vicinity of the current position of the vehicle is displayed magnified compared to the portions of the map in the distance (refer to U.S. Pat. No. 5,161,886). The apparatus disclosed in the publication mentioned above sets a viewpoint to the rear of the current position of the vehicle and displays, on the screen of a display device, roads viewed from this viewpoint looking down in the advancing direction of the vehicle. In such a bird's-eye view display, the road map in the vicinity of the current vehicle position can be displayed enlarged and, since a wide range of area from the current position to distant positions can be displayed, it is easy to visually read the connection state and so forth on the road map. Moreover, a road map can be displayed in such a realistic manner that the driver will feel as if he were looking down at the road himself.

In order to display a road map in the bird's-eye view format, road maps for bird's-eye view display may be stored in a CD ROM or the like in advance. However, since the map scale constantly changes with a bird's-eye view as the viewpoint moves, the quantity of data required for the road map becomes massive. Because of this, it is a general practice to convert road map data for normal planar map display to bird's-eye-view data for display. However, since the conversion calculation to obtain bird's-eye-view data must be performed every time the position of the viewpoint moves, screen redraw becomes slow and this could detract from ease of use.

SUMMARY OF THE INVENTION

An object of the present invention is to provide a map display apparatus that is capable of converting map data to bird's-eye-view map data through simple calculation.

When converting planimetric map data to bird's-eye-view map data for displaying a bird's-eye-view map created through the bird's-eye-view projection, the map display apparatus according to the present invention, instead of executing complicated arithmetic calculations, uses conversion tables to create data for a bird's-eye-view map display from the planimetric map data.

The conversion tables perform data conversion in such a manner that a bird's-eye-view map, which is obtained when a planar map is looked down upon at a specific look down angle and with a specific aspect angle from a viewpoint set above the vicinity of a specific position on the map, is displayed on a monitor.

When the present invention is adopted in a road map display apparatus, the conversion tables convert positional coordinates of nodes for expressing a road map to positional coordinates of corresponding nodes on a bird's-eye-view map created through bird's-eye-view projection. In this case, the data conversion is performed in such a manner that a bird's-eye-view map obtained by looking down upon the road map at a specific look-down angle and with a specific aspect angle from a viewpoint set above the vicinity of the current position of the vehicle on the road map, is displayed on the monitor.

The bird's-eye-view map display data are prepared in such a manner that, when a hypothetical rectangular display screen perpendicular to a look-down line that passes through the viewpoint and extends at a specific look-down angle toward the plane of the road map, is set at a position that is separated from the viewpoint by a specific distance, the bird's-eye-view map is displayed by projecting a trapezoidal area of the road map onto the hypothetical rectangular display screen.

When the display screen is divided into at least two portions, i.e., a first area, closer to the current vehicle position and a second area, further away from the current vehicle position, the conversion tables include a first table and a second table which correspond to the first area and the second area respectively.

When an area for which the coordinate conversion is to be performed on the data of the road map to be displayed is selected, if there are any nodes that are outside the area among the nodes of polygons or links, at least a portion of each of which is included in the data for the area, the positional coordinates of the nodes outside the area are corrected to specific positions within the selected range and then data conversion is performed.

When the present invention is adopted in a navigation system for vehicles, the navigation system comprises a read device that reads planimetric map data from a recording medium that stores planimetric map data of a road map, a current position detection device that detects the current position of a vehicle, a storage circuit that stores in memory function tables for converting positional coordinates of nodes included in a road map in the vicinity of the detected current position to positional coordinates of nodes on a bird's-eye-view map obtained by looking down upon the road map in a specific direction, at a specific look-down angle and with a specific aspect angle from a viewpoint set above the vicinity of the detected current position and a bird's-eye-view map display data preparation circuit that reads out data related to coordinate positions of nodes on the bird's-eye-view map by operating the conversion table with the coordinate positions of nodes on the road map and prepares bird's-eye-view map display data for displaying the bird's-eye-view map on the monitor based upon the data thus read out.

Functions similar to those of the map display apparatus and the navigation system for vehicles described above can be achieved by setting a recording medium in a read device such as a CD ROM connected to a computer. In that case, a storage device that stores in memory planimetric map data of a road map and a current position detection device for detecting the current position of a vehicle are connected to the computer, and a program that executes a procedure through which the planimetric map data are read from the storage device, a procedure through which the current position is read from the current position detection device and a procedure through which, when converting positional coordinates of nodes contained in a road map in the vicinity of the detected current position to positional coordinates of nodes on a bird's-eye-view map obtained by looking down upon a road map in a specific direction, at a specific look-down angle and with a specific aspect angle from a viewpoint set above the vicinity of the detected current position by using a function table, data related to the coordinate positions of the nodes on the bird's-eye-view map are read out by operating the conversion tables with the positional coordinates of the nodes on the road map, and bird's-eye-view map display data for displaying a bird's-eye-view map on a monitor are prepared based upon the data thus read out, is stored in the according medium.

According to the present invention, since tables of relationships between the positional coordinates of nodes included in map data and the positional coordinates in bird's-eye-view map data that correspond to those of the nodes are stored in memory in advance, conversion to bird's-eye-view map data can be performed speedily and simply by utilizing these tables. consequently, the speed at which the screen is redrawn in bird's-eye view map display improves.

BRIEF DESCRIPTION OF THE DRAWINGS

FIG. 13A and 13B show data arrangement of function tables to be stored in ROM.

DESCRIPTION OF THE PREFERRED EMBODIMENTS

Figure 1:
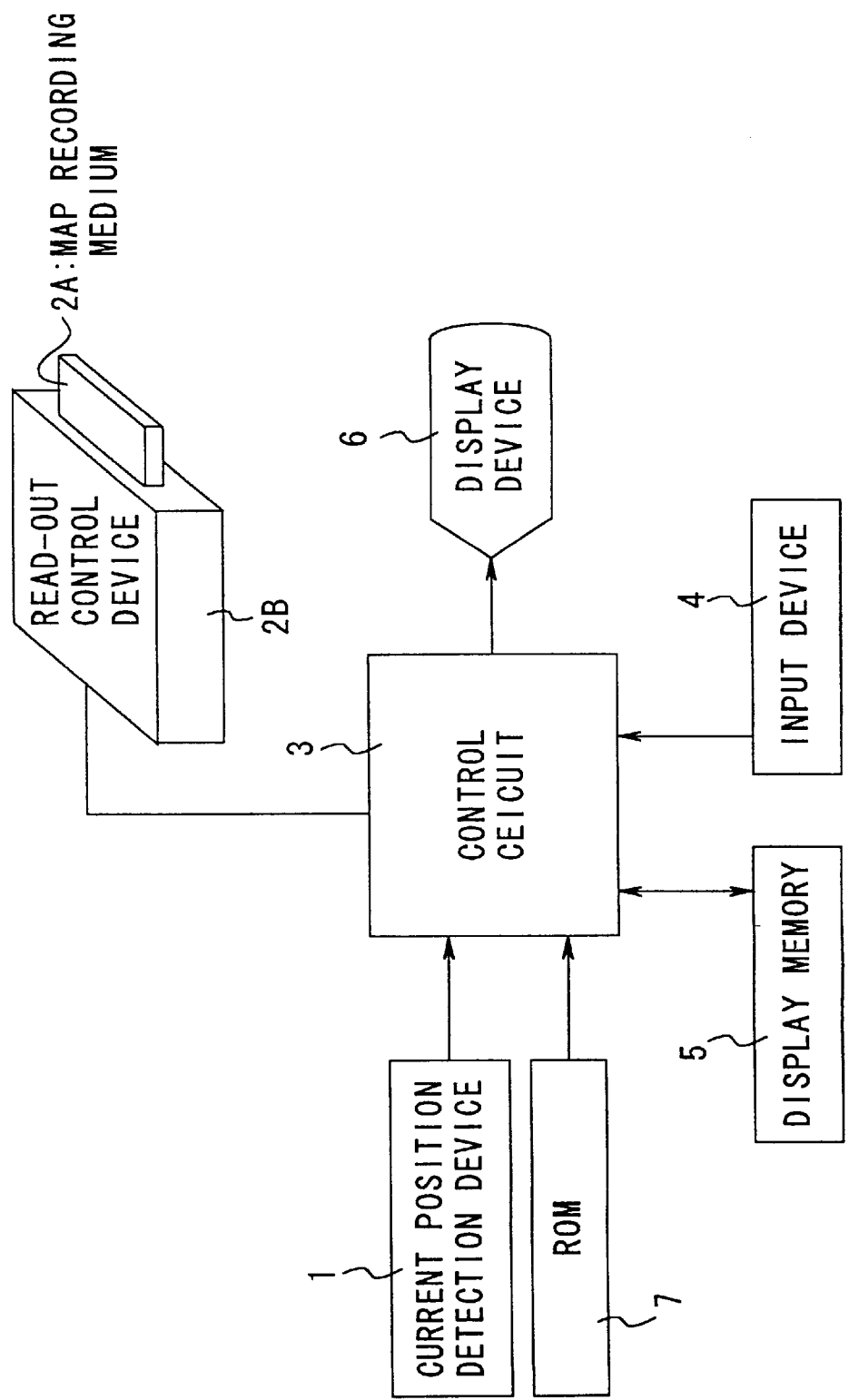
FIG. 1 shows a block diagram of an embodiment of the map display apparatus for vehicles according to the present invention.

FIG. 1 is a block diagram of an embodiment of the map display apparatus for vehicles according to the present invention. In FIG. 1, reference number 1 indicates a current position detection device that detects the current position of the vehicle and is constituted with, for instance, an azimuth sensor that detects the advancing azimuth of the vehicle, a vehicle speed sensor that detects the vehicle speed, a GPS sensor that detects GPS signals sent from a GPS (Global Positioning System) satellite and the like. Reference number 2a indicates a map recording medium that stores road map data at a plurality of different map scales. The map recording medium 2a is connected to a read control device 2b in such a manner that it can be detached and attached freely and the read-out control device 2b reads out the road map data stored in the map recording medium 2a in response to a command issued by a CPU which is to be detailed later. The read-out control device 2b is for example a CD-ROM device.

Reference number 3 indicates a control circuit that controls the entire apparatus and is constituted with a microprocessor and its peripheral circuits. Reference number 4 indicates an input device, which inputs the destination and the like of the vehicle, and reference number 5 indicates a display memory that stores image data to be displayed on a display device 6. The image data stored in the display memory 5 are read out as necessary to be displayed on the display device 6. Reference number 7 indicates a ROM in which function tables for coordinate transformation, which are to be described later, are stored.

Description of Main Processing

Figure 2:
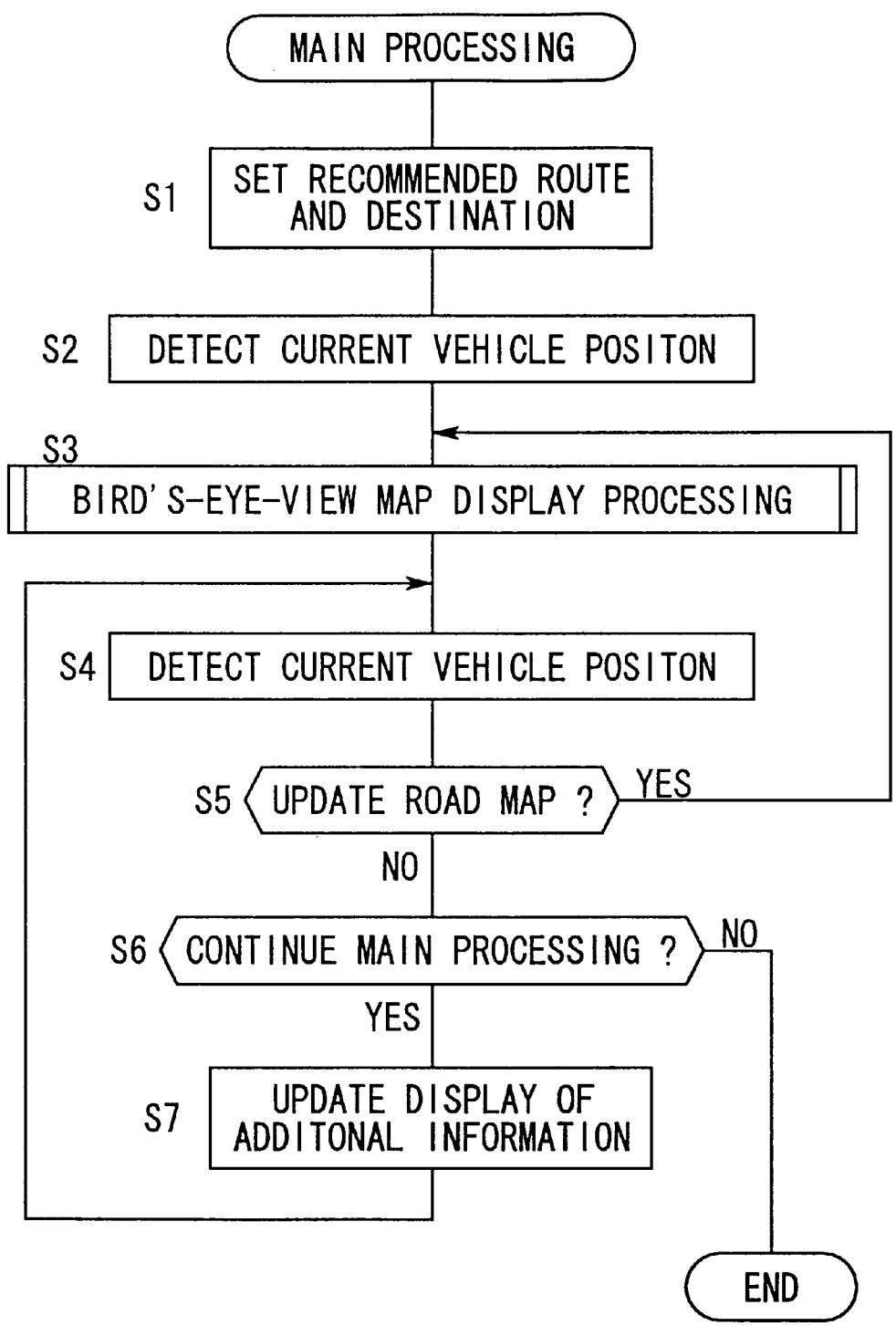
FIG. 2 is a flowchart illustrating the main processing performed by the control circuit.

FIG. 2 is a flowchart illustrating the main processing performed by the control circuit 3. The following is an explanation of the operation performed in this embodiment in reference to this flowchart. Note that the control circuit 3 starts the processing shown in FIG. 2 when the main power is turned on.

In step S1 in FIG. 2, a recommended route and a destination are set. The destination is set by the operator via the input device 4 and the recommended route is automatically set through calculation employing the Dijkstra method or the like in the known art. Alternatively, candidates for recommended routes may be stored in the ROM 7 or the like in advance and a recommended route may be selected from among those candidates. Note that if it is not specifically required, a recommended route need not be set.

Figure 3:
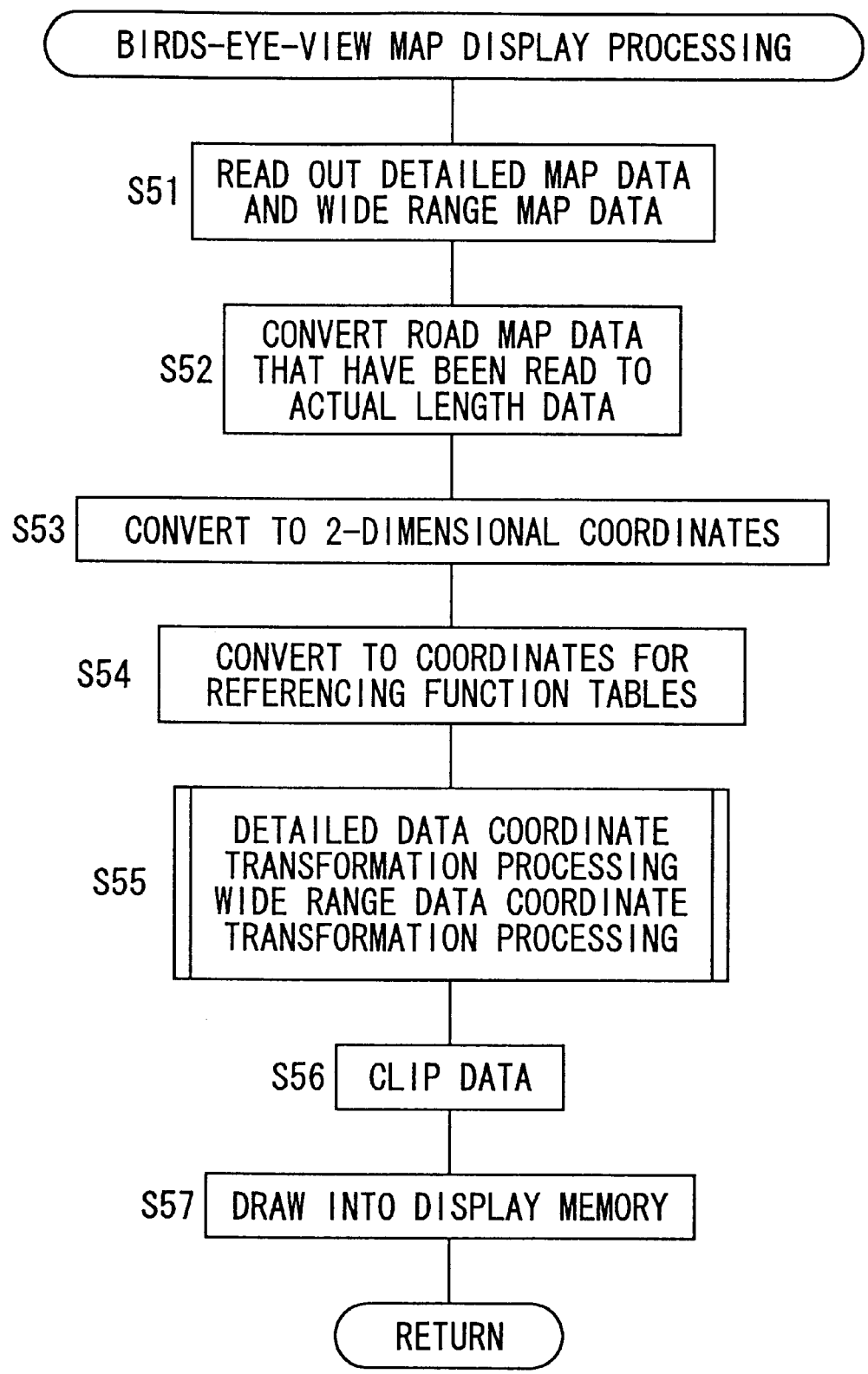
FIG. 3 is a detailed flowchart of the bird's-eye view map display processing performed in step S3 in FIG. 2.

In step S2, the current position of the vehicle is detected using the current position detection device 1. In step S3, the bird's-eye view display processing, details of which are shown in FIG. 3, is performed. The detail of the bird's-eye view display processing are also described later.

In step S4, as in step S2, the current position of the vehicle is detected. In step S5, a decision is made as to whether or not the road map on the screen is to be updated, i.e., whether or not the road map is to be redrawn. In this embodiment, it is decided that the road map is to be updated, for instance, when the vehicle has traveled at least a specific distance, when the operator has issued a command for scrolling via the input device 4 or the like.

If an affirmative decision is made in step S5, the operation returns to step S3 to redraw the screen, whereas, if a negative decision is made in step S5, the operation proceeds to step S6. In step S6, a decision is made as to whether or not the operation is to carry on with the main processing shown in FIG. 2. For instance, if the power switch (not shown) has been turned off or if the switch for halting the processing has been operated, a negative decision is made in step S6 and the main processing in FIG. 3 ends.

If an affirmative decision is made in step S6, the operation proceeds to step S7, in which updating of the display of additional information is performed, before the operation returns to step S4. The additional information in this context refers to, for instance, the vehicle position mark and the like displayed at the current position of the vehicle and, in step S7 described above, in correspondence to the distance traveled by the vehicle, the display position of the additional information such as the vehicle position mark and the like is changed.

Description of Bird's-Eye View Display Processing

Figure 4:
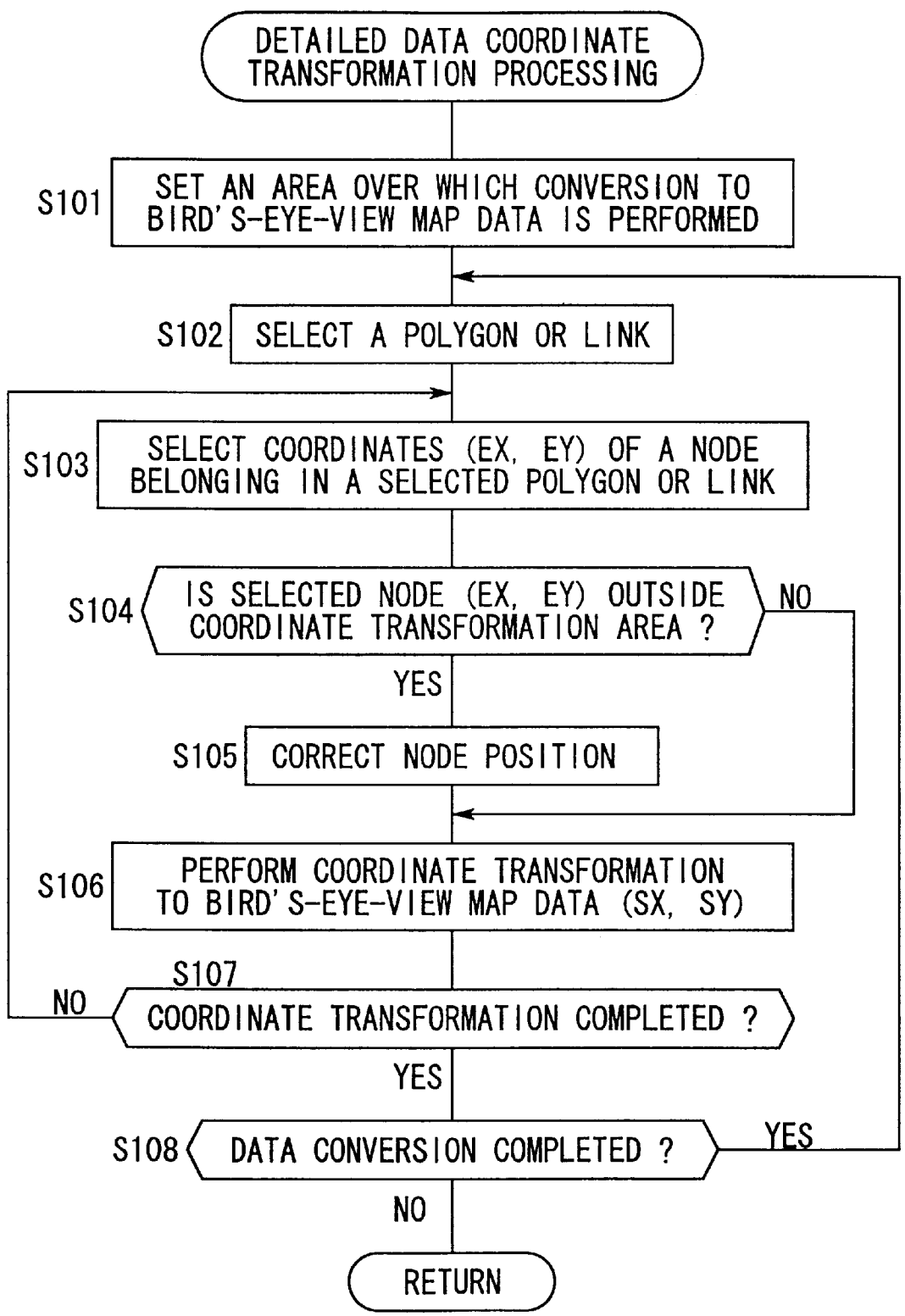
FIG. 4 is a detailed flowchart of the detailed data coordinate transformation processing performed in step S55 in FIG. 3.
Figure 5:
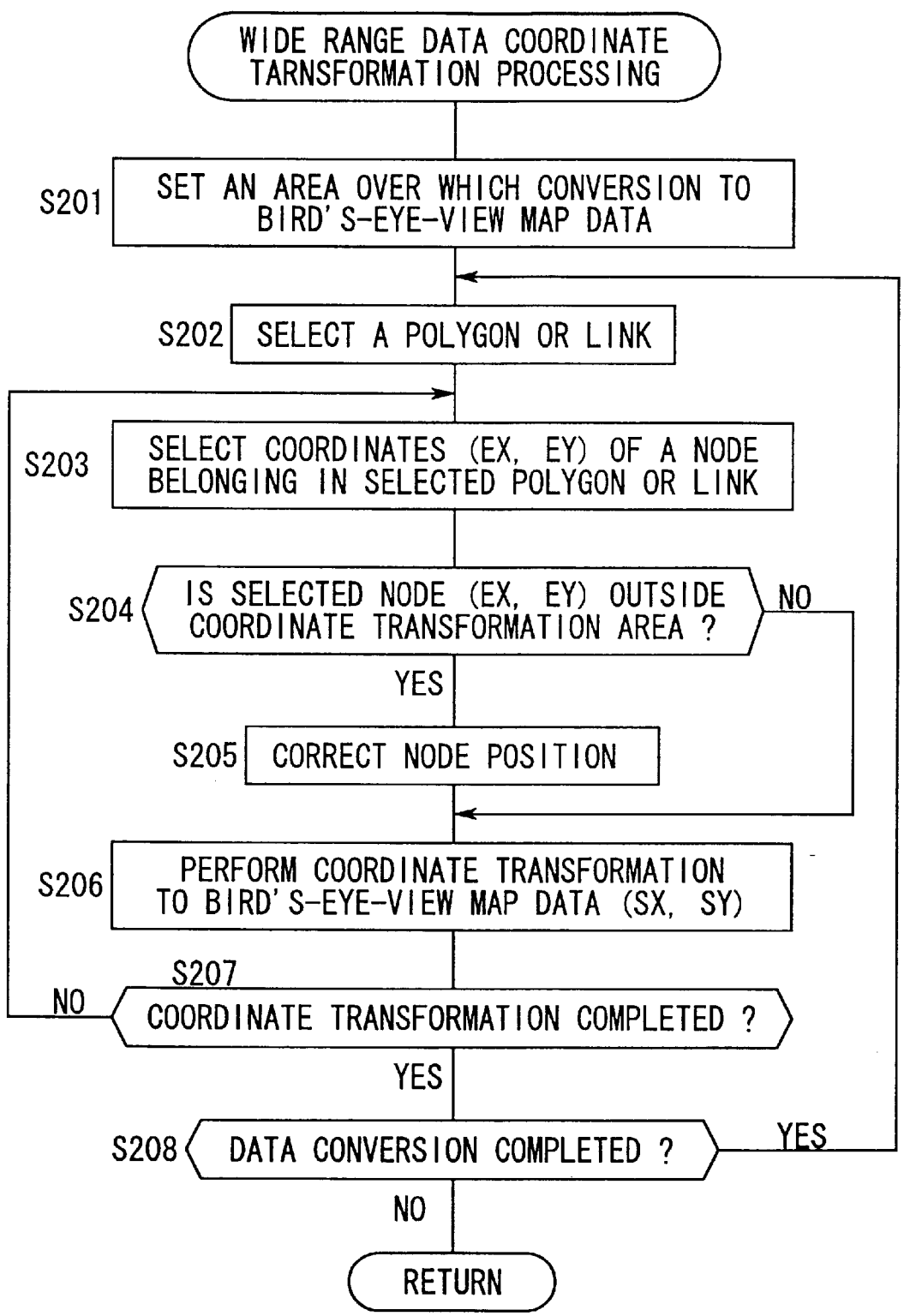
FIG. 5 is a detailed flowchart of the wide range data coordinate transformation processing performed in step S55 in FIG. 3.

FIG. 3 is a detailed flowchart of the bird's-eye view display processing performed in step S3 in FIG. 2. In step S51 in the figure, the detailed map data and the wide range map data stored in the map recording medium 2a are read. In step S52, the road map data thus read are converted to actual length data. In step S53, conversion processing is performed to convert the data to 2-dimensional coordinates on X and Y axes. In step S54, the Y-axis coordinate is converted to a coordinate with which a function table, which is to be described later, can be referenced. In step S55, detailed data coordinate transformation processing, the details of which are shown in FIG. 4, and wide range data coordinate transformation processing, the details of which are shown in FIG. 5, are performed. The details of the processing shown in FIGS. 4 and 5 are described later.

In step S56, data which are to be actually displayed on the screen are clipped from the data included in the bird's-eye-view data obtained through the detailed data coordinate transformation processing in FIG. 4 and the bird's-eye-view data obtained through the wide range data coordinate transformation processing shown in FIG. 5. The clipped data are drawn in the display memory 5 in step S57. With this, a bird's-eye view using the detailed map data is displayed up to a specific height from the lower side of the screen and a bird's-eye view using the wide range map data is displayed in the area above that. Different types of road map data are used at different positions in the height of the screen in this manner because, in the case of bird's-eye view display, the portion toward the lower side of the screen is displayed at a smaller scale.

Figure 6:
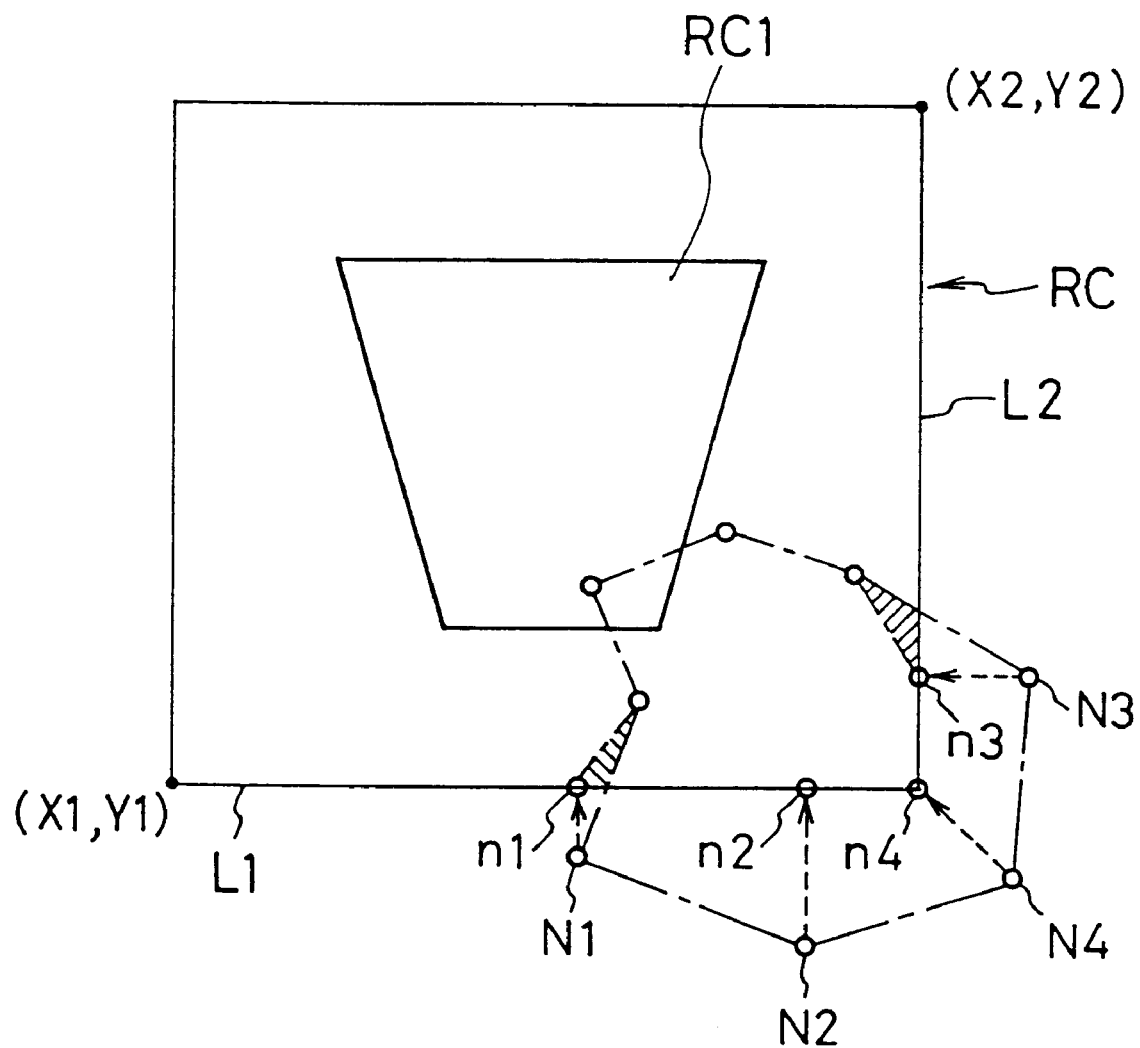
FIG. 6 is an illustration of the coordinate transformation area.

FIG. 4 is a detailed flowchart illustrating the detailed data coordinate transformation processing performed in step S55 shown in FIG. 3. In step S101 in FIG. 4, using the vehicle position detected in step S2 in FIG. 2 for reference, the area over which the planar map data are to be converted to bird's-eye-view data is set. This area is indicated as the area RC in the advancing direction of the vehicle, as shown in FIG. 6. Hereafter, the area RC is referred to as the coordinate transformation area. Note that the trapezoidal area RC1 inside the coordinate transformation area indicates the range over which actual display is made on the display device 6.

In step S102, a polygon or link, at least a portion of which is included within the coordinate transformation area and which has not yet been selected, is selected. A polygon means an area such as a lake, park and green tract and has a plurality of nodes. A link means each of a plurality of sections into which a road is divided and a link has nodes at the start and end points of a link. Each node has a positional coordinate in a road map. In step S103, the positional coordinates E (Ex, Ey) of a node that belongs in a selected polygon or link and for which coordinate transformation has not yet been performed, are selected. In S104, a decision is made as to whether or not the selected node is outside the coordinate transformation area. In other words, in step S104, if a portion of the polygon or the link selected in step S102 extends beyond the coordinate transformation area, a decision is made as to whether or not a node in that extended portion has been selected in step S103.

If an affirmative decision is made in step S104, the operation proceeds to step S105, in which the node position is corrected to a location on the end side of the coordinate transformation area which is the closest to the position of the selected node. The processing performed in step S105 is to be described in detail later.

In step S106, the node positional coordinates E(Ex, Ey) are converted to bird's-eye view display coordinates S(Sx, Sy) using the function tables fb(Ey) and gb(Ey) which are to be detailed later. The details of the processing performed in step S106 are to be given later.

When the processing in step S106 ends, the operation proceeds to step S107, in which a decision is made as to whether or not coordinate transformation has been performed for all the nodes belonging in the selected polygon or link. If a negative decision is made, the operation returns to step S103, whereas, if an affirmative decision is made, the operation proceeds to step S108. In step S108, a decision is made as to whether or not there is still a polygon or a link left un-converted in the coordinate transformation area. If an affirmative decision is made, the operation returns to step S102, whereas if a negative decision is made, the operation returns to step S55.

FIG. 5 is a detailed flowchart illustrating the wide range data coordinate transformation processing performed in step S55 in FIG. 3. The wide range data coordinate transformation processing is identical to the detailed data coordinate transformation processing except that different function tables are used for coordinate transformation. In other words, in step S206 in FIG. 5, the node position coordinates E(Ex, Ey) are converted to bird's-eye view display coordinates S(Ex, Ey) using the function tables fa(Ey) and ga(Ey) which are to be described in detail later.

Thus, in the bird's-eye view display processing shown in FIGS. 3 through 5, the coordinate transformation area is set around the vehicle position on the road map and polygons or links that are present inside that area are sequentially selected. Then, nodes belonging in a selected polygon or link are selected one by one and the positional coordinates of each node are converted to bird's-eye view display coordinates. To be more specific, both the detailed map data and the wide range map data are converted to bird's-eye-view data and after the conversion, the individual sets of data are clipped to perform drawing into the display memory 5.

Description of Coordinate Transformation Using Detailed Map Data

Figure 7:
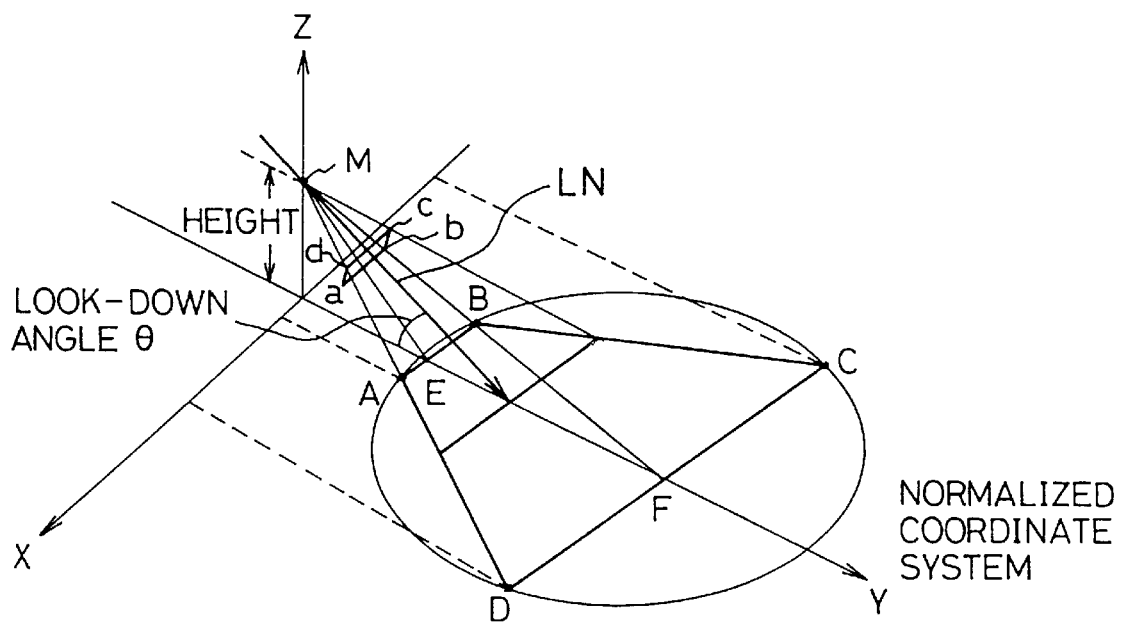
FIG. 7 is an illustration of conversion to bird's-eye-view map data.
Figure 8A:
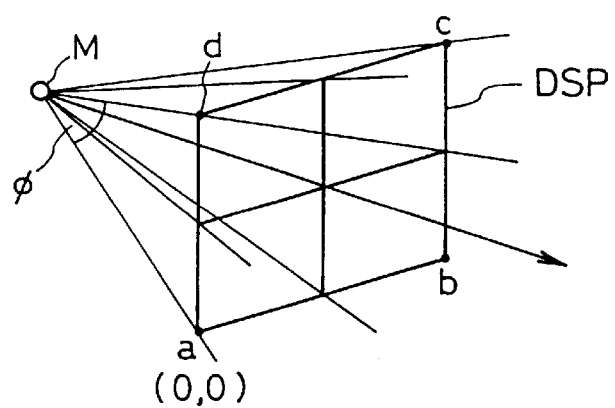
FIG. 8A is an enlargement of the rectangular area abcd in FIG. 7.

FIG. 7 illustrates a conversion to bird's-eye-view data and in this example, the road map lies on an X-Y plane, a viewpoint M is set on a Z axis running at a right angle to the X-Y plane and the look-down angle from the viewpoint M is designated θ. The rectangular area abcd in the figure indicates the imaginary or hypothetical range of display on the display device 6 as shown in an enlargement in FIG. 8A. The bird's-eye-view map is made by projecting the road map in the trapezoid area ABCD onto the imaginary screen area abcd.

In order to convert the road map data to bird's-eye-view map data, a height Vz of the viewpoint M, the look-down angle θ from the viewpoint M and the aspect angle φ from the viewpoint M are first determined and then, using these parameters, the coordinates within the trapezoidal area ABCD are converted to coordinates inside the display screen area abcd so that the entirety of the road map data inside the trapezoidal area ABCD in the figure can be displayed on the display device 6. The area abcd is called as an imaginary or a hypothetical screen area DSP. When a line extending in a vehicle travelling direction with a look-down angle θ from the viewpoint M is expressed by LN, the imaginary screen area DSP lies on a plane perpendicular to the line LN at the points apart from the viewpoint M on the line LN by the distance Ds. At this time, the look-down angle θ must be set while ensuring that the vicinity of the central line connecting the mid-points of the upper and the lower sides of the display screen of the display device 6 constitutes the direction of the destination.

Figure 9:
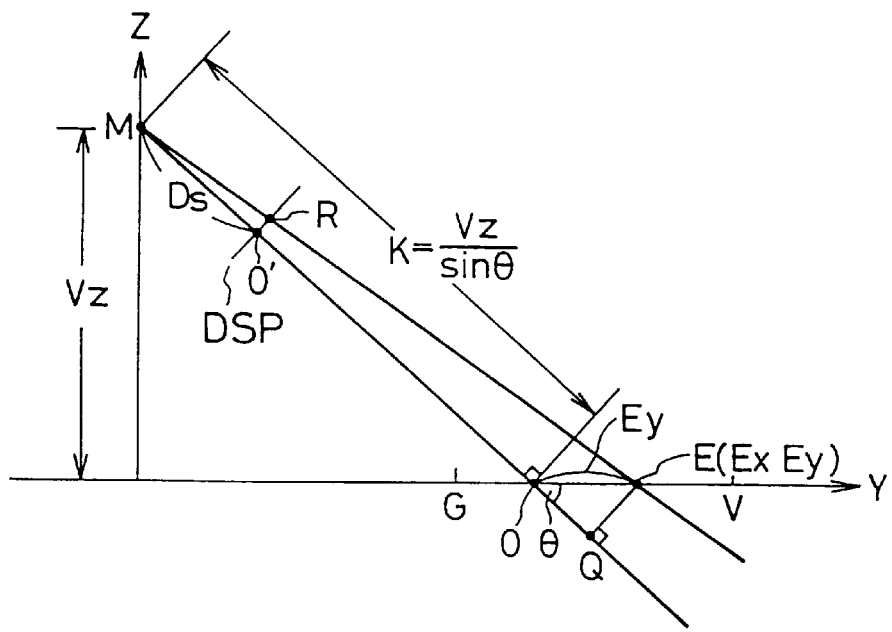
FIG. 9 is a projection of FIG. 7 on to the Y-Z plane.

FIG. 9 is a projection of FIG. 7 on to the Y-Z plane. In FIG. 9, the position of the viewpoint is designated M, the center of the display screen area DSP is designated O', the coordinate position (coordinate origin point) on the road map, which corresponds to the center O' of the display screen area, is designated O, the current position of the vehicle is designated G and a given coordinate position on the map is designated E(Ex, Ey). The cross point of the line LN with the screen area DSP is a center O' of the screen area DSP and the cross point of the line LN with the X-Y plane is a origin O of the coordinate on the road map. In addition, the nodal point, where a line descending from the point E vertically to the line segment MO intersects the line segment MO, is designated Q and the nodal point of the line segment ME and the display screen area DSP is designated R. At this time, the relationship presented in expression (1) is valid.

$$MQ = MO + OQ = K + Ey \cdot \cos\theta \tag{1}$$

Note that in expression (1), the length of the line MO is designated K and the angle formed by the line OE and OQ is designated θ.

Since, in FIG. 9, the triangle MO'R and the triangle MQE are proportionately identical to each other, expression (2) is valid.

$$MQ:MO' = EQ:RO' \tag{2}$$

Figure 8B:
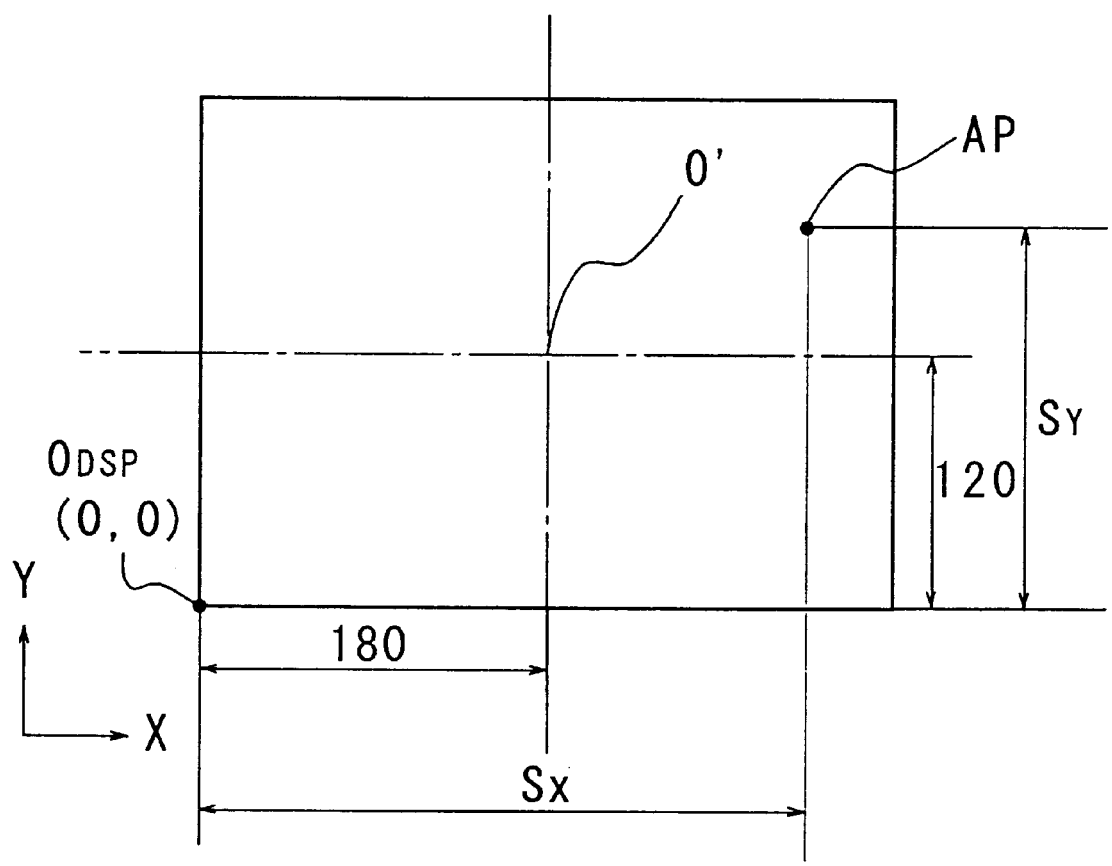
FIG. 8B is an illustration of the rectangular area abcd.

When the number of dots in the horizontal direction in the display screen area on the display device 6 is 360, the number of dots in the vertical direction is 240 and the coordinate origin (O, O) on the imaginary display screen area DSP is on the left lower corner on the area DSP as shown in FIG. 8B, a given coordinate position on the screen is expressed as (Sx, Sy), and expression (2) is presented as in expression (3).

$$(K + Ey \cdot \cos\theta):Ds = Ey \cdot \sin\theta:(Sy - 120) \tag{3}$$

Expression (4) is obtained by modifying expression (3).

$$Sy = \{(Ds \times Ey \cdot \sin\theta)/(K + Ey \cdot \cos\theta)\} + 120 \tag{4}$$

Figure 10:
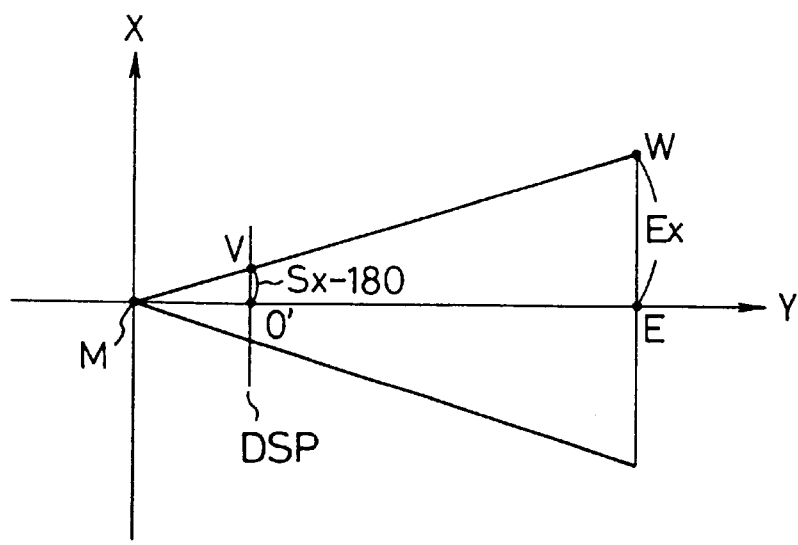
FIG. 10 is a projection of FIG. 7 on to the X-Y plane.

FIG. 10 is a projection of FIG. 7 on to the X-Y plane. Since, in FIG. 10, the triangle MO'V and the triangle MEW are proportionately identical to each other and the dimensional ratio between them is the same as the ratio in expression (3), the relationship as expressed in expression (5) is valid.

$$(K + Ey \cdot \cos\theta):Ds = Ex:(Sx - 180) \tag{5}$$

Expression (6) is obtained by modifying expression (5).

$$Sx = Ex \cdot Ds/(K + Ey \cdot \cos\theta) + 180 \tag{6}$$

Thus, by substituting the nord coordinates (Ex, Ey) on the planar map into expressions (4) and (6), they are converted to coordinates (Sx, Sy) for bird's-eye view display coordinate.

Description of Coordinate Transformation Using Wide Range Map Data

Regardless of whether the conversion is performed using the detailed map data or the wide range map data, basically the conversion to the bird's-eye view display coordinates is performed using expressions equivalent to expressions (4) and (6), except that some of the factors in expressions (4) and (6) change depending upon the type of the map data.

Figure 11:
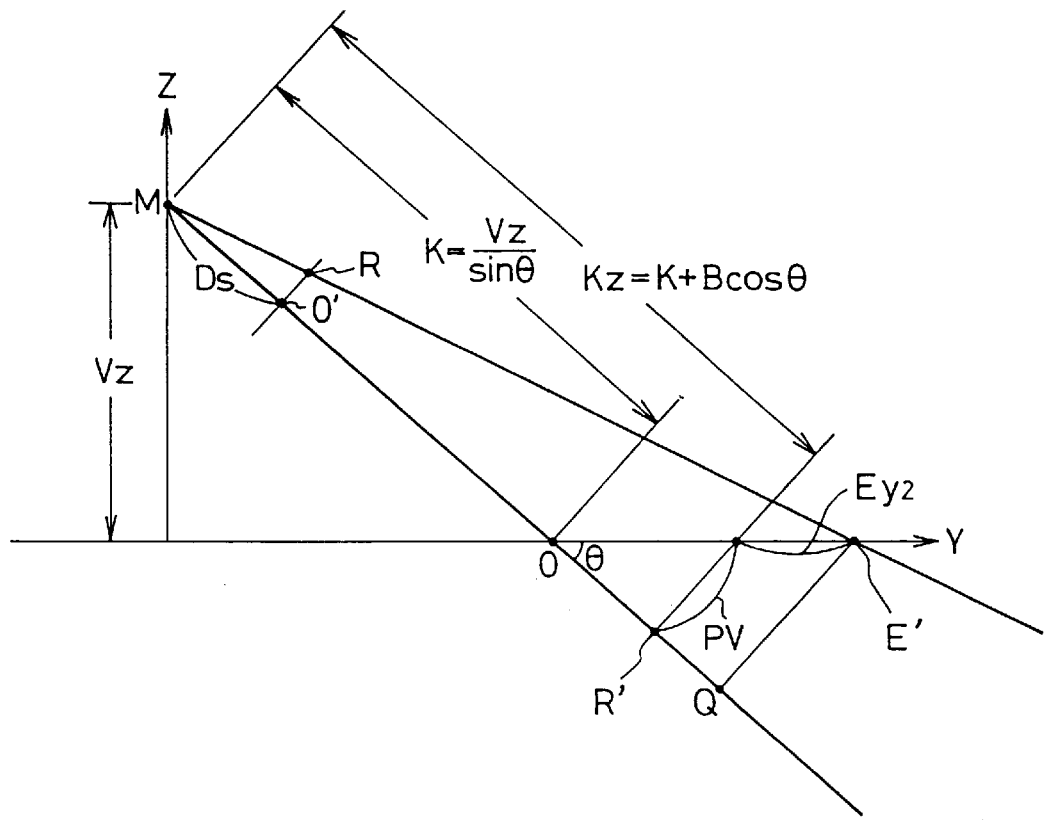
FIG. 11 shows an example in which the Y-axis coordinate Ey in road map data exceeds a specific value V, projecting FIG. 7 on to the Y-Z plane.
Figure 12:
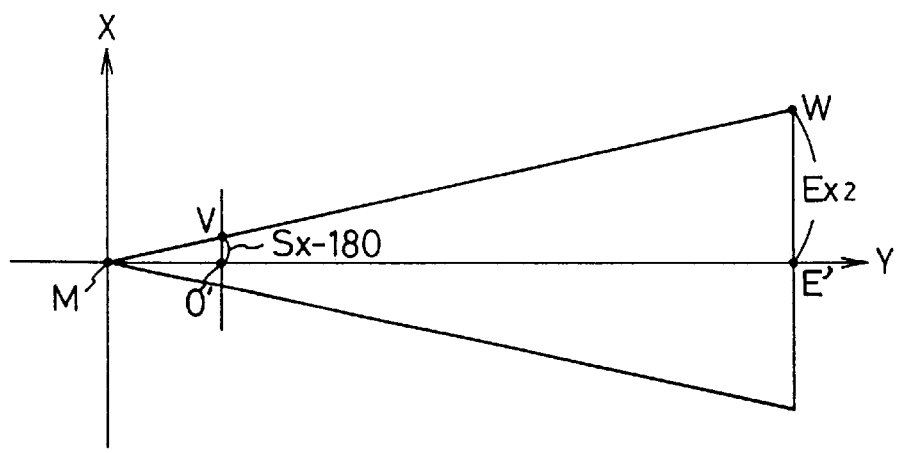
FIG. 12 shows an example in which the Y-axis coordinate Ey in road map data exceeds a specific value V, projecting FIG. 7 on to the X-Y plane.

FIGS. 11 and 12 show an example in which the Y-axis coordinate Ey of the road map data exceeds a specific value V. Note that the specific value V represents the position of the boundary of the area over which the conversion is performed using the detailed map data and the area over which the conversion is performed using the wide range map data. By taking advantage of the fact that the triangle MO'R and the triangle MQE' are proportionately identical to each other, as shown in the figures, the relationship expressed in expression (2) described earlier is valid.

When the nodal point of the vertical line descending from the coordinate V to the line segment MQ is designated R', P=V·sin θ, the length of the line segment MR' is designated K2 and the coordinates of point E' with point V used for reference, are designated (Ex2, Ey2), expression (2) is presented as in expression (7).

$$Ds:(K2 + Ey2 \cdot \cos\theta) = (Sy - 120):(P + Ey2 \cdot \sin\theta) \tag{7}$$
$$= (Sx - 180):Ex2$$

Expressions (8) and (9) are obtained by modifying expression (7).

$$Sx = Ex \cdot Ds/(K + Ey \cdot \cos\theta) + 180 \tag{8}$$

$$Sy = Ds \times (P + Ey2 \cdot \sin\theta)/(K2 + Ey2 \cdot \cos\theta) + 120 \tag{9}$$

With expressions (4), (6), (8) and (9), the detailed map data or the wide range map data can be converted to bird's-eye-view map data. However, the calculation will be time consuming since each of these expressions includes division. Because of this, in this embodiment, when performing coordinate transformation using the detailed map data, function tables fb(Ey) and gb(Ey) as presented in expressions (10) and (11) are prepared and are stored in advance inside the ROM.

$$fb(Ey) = Sy = (Ds \times Ey \cdot \sin\theta)/(K + Ey \cdot \cos\theta) + 120 \tag{10}$$

$$gb(Ey) = Ds/(K + Ey \cdot \cos\theta) \tag{11}$$

Likewise, when performing coordinate transformation using the wide range map data, function tables fa(Ey) and ga(Ey) as presented in expression (12) and (13) are prepared in advance.

$$fa(Ey) = Sy = Ds \times (P + Ey2 \cdot \sin\theta)/(K2 + Ey \cdot \cos\theta) + 120 \tag{12}$$

$$ga(Ey) = Ds/(K2 + Ey2 \cdot \cos\theta) \tag{13}$$

With these function tables stored in advance in the ROM 7, it becomes possible to perform conversion to coordinates (Sx, Sy) for bird's-eye view map display without performing complicated calculations. In other words, for the Y-axis coordinate, the output of the function tables fb(Ey) and fa(Ey) constitute, as is, the bird's-eye view map display coordinates Sy and for the X-axis coordinate, the bird's-eye view map display coordinate is obtained by performing calculation with the values obtained with the function tables gb(Ey) and ga(Ey) substituted in expression (14).

$Sx=g(Ey)\cdot Ex+180$ (14)

Note that having a massive quantity of data in the tables is not significant since values that can be taken for Sx and Sy are restricted by the number of display dots on the screen. As a result, when the number of display dots on the screen is 360 in the direction of the X-axis and 240 in the direction of the Y-axis, for instance, values that fall within the ranges of $0 \leq Sx \leq 360$, $0 \leq Sy \leq 240$, should be stored in the tables.

FIG. 13A shows an example of data arrangement for the function tables fb(Ey) and gb(Ey) stored in the ROM. As shown in FIG. 13A, a set of corresponding table values gb and fb is provided for each Y-axis coordinate value, and a total of 1,024 sets (2,048 values) are provided. In addition, at the leading portion of the tables, the coordinates of the coordinate transformation area set in step S101 in FIG. 4 (the coordinates of the two points in FIG. 6) are stored.

Likewise, FIG. 13B is an example of data arrangement of function tables fa(Ey) and ga(Ey). As shown in the figure, a set of corresponding table values ga and fa is provided for each Y-axis coordinate value, and a total of 512 sets (1,024 values) are provided.

Description of Node Position Correction

In step S105 in FIG. 4, some of the nodes belonging in the selected polygon or link are located outside the coordinate transformation area and the processing for moving the coordinate positions of these nodes to the end side of the coordinate transformation area is performed.

FIG. 6 shows an example in which a portion of the polygons is outside the coordinate transformation area. In the case illustrated in FIG. 6, each node located outside the coordinate transformation area is made to move to the end side of the coordinate transformation area that is the closest from the position of the particular node, as shown in the figure. More specifically, as shown in the figure, nodes N1 and N2 are made to move to the closest position n1 and n2 respectively on the end side L1. Likewise, node N3 is made to move to the closest position n3 on the end side L2. As for node N4, it is made to move to a corner position n4 in the coordinate transformation area.

By correcting node positions in this manner, it is ensured that no polygons or links lie astride a plurality of coordinate transformation areas, and thus the processing through which coordinate transformation to bird's-eye view map display coordinates is performed can be simplified.

On the other hand, when node positions are corrected as shown in FIG. 6, a problem arises in that the shape of the polygon or link changes as indicated with the diagonal shading in the figure. However, by providing at least one node positioned between the trapezoidal area that is actually displayed on the screen and the peripheral edge portions of the coordinate transformation area surrounding the trapezoidal area, the shapes of polygons and links within the range displayed on the screen will not change.

While, in the embodiment described above, different function tables are provided for two types of road map data, function tables may be provided for each viewpoint position and look-down angle. In that case, by switching among these function tables continuously, it is possible to view through 360° around the viewpoint position.

We claim:

1. A map display apparatus comprising:
a table storage device that stores a conversion table for converting data for displaying a map as a planar map to data for displaying said map as a bird's-eye-view map created through bird's-eye-view projection, said conversion table being prepared in advance via calculations; and
a bird's-eye-view map display data preparation device that prepares bird's-eye-view map display data for displaying said bird's-eye-view map on a monitor based upon said data from said conversion table.

2. A map display apparatus according to claim 1, wherein:
said conversion table performs data conversion in such a manner that a bird's-eye-view map obtained by looking down upon said planar map at a predefined look-down angle and with a predefined aspect angle from a viewpoint set above a vicinity of a predefined position on said map, is displayed on said monitor.

3. A map display apparatus according to claim 2, wherein;
said conversion table is a function table that converts positional coordinates of nodes on said planar map to positional coordinates of nodes on said bird's-eye-view map.

4. A map display apparatus according to claim 2, wherein:
said bird's-eye-view map display data preparation device prepares bird's-eye-view map display data so that, when a hypothetical rectangular display screen perpendicular to a look-down line that passes through said viewpoint extending toward a plane of said map at said look-down angle, is set at a position separated from said viewpoint by a predefined distance, said bird's-eye-view map is displayed by projecting a map in a trapezoidal area on said plane of said map onto said hypothetical rectangular display screen.

5. A map display apparatus comprising:
a table storage device that stores a function table for converting positional coordinates of nodes for expressing a road map to positional coordinates of said nodes on a bird's-eye-view map to be displayed through a bird's-eye-view projection, said function table being prepared in advance via calculations; and
a bird's-eye-view map display data preparation device that prepares bird's-eye-view map display data for displaying said bird's-eye-view map based upon data converted by said function table.

6. A map display apparatus according to claim 5, wherein:
said function table performs data conversion in such a manner that a bird's-eye-view map that is expressed by looking down upon said road map at a predefined look-down angle and with a predefined aspect angle from a viewpoint set above a vicinity of a current vehicle position on said map is displayed on a monitor.

7. A map display apparatus according to claim 6, wherein:
said bird's-eye-view map display data preparation device prepares bird's-eye-view map display data so that, when a hypothetical rectangular display screen perpendicular to a look-down line that passes through said viewpoint extending toward a plane of said map at said look-down angle, is set at a position separated from said viewpoint by a predefined distance, said bird's-eye-view map is displayed by projecting a map in a trapezoidal area of said road map onto said hypothetical rectangular display screen.

8. A map display apparatus according to claim 7, wherein:
if a central position on said hypothetical rectangular display screen is designated O', a reference position on a road map corresponding to said central position O' is designated O, a distance from said viewpoint to said hypothetical rectangular display screen is designated Ds, a distance from said viewpoint to said reference position O is designated K, an X-axis coordinate of a node to be converted on said road map is designated Ex, a Y-axis coordinate of said node is designated Ey, an X-axis coordinate on said hypothetical rectangular display screen corresponding to said X-axis coordinate Ex of said node is designated Sx and a Y-axis coordinate on said hypothetical rectangular display screen corresponding to said Y-axis coordinate Ey of said node is designated Sy;

said table storage device stores function tables f(Ey), as presented in expression (1), and g (Ey), as presented in expression (2), that use said Y-axis coordinate Ey of said node for an input parameter, $$f(Ey)=Ds \times Ey \times \sin\theta/(K+Ey \times \cos\theta)+c1 \quad (1)$$

with c1 being a constant $$g(Ey)=Ds/(K+Ey \times \cos\theta) \quad (2);$$

and said bird's-eye-view map display data preparation device converts data (Ex, Ey) for positional coordinates of a node on said road map to said bird's-eye-view map display data (Sx, Sy) based upon expressions (3) and (4), $$Sx=g(Ey) \times Ex+c2 \quad (3)$$

with c2 being a constant $$Sy=f(Ey) \quad (4).$$

9. A map display apparatus according to claim 8, wherein:

said table storage device is provided with a plurality of sets of said function tables with each of said plurality of sets constituted with a pair of said function tables f(Ey) and g(Ey); and said bird's-eye-view map display data preparation device creates a final version of said bird's-eye-view map display data based upon an outcome of a conversion performed using each set of said function tables.

10. A map display apparatus according to claim 9, wherein:

when said display screen is divided into at least two portions, i.e., a first area closer to said current vehicle position and a second area farther from said current vehicle position, said function tables are provided with a first table and a second table constituted with functions f (Ey) and g (Ey) presented in said expressions (1) and (2) that are respectively suited for said first area and said second area.

11. A map display apparatus according to claim 5, further comprising:

a road map data selection device that selects road map data within a predefined range around said vehicle current position as a coordinate transformation area; and a graphic selection device that selects a polygon or a link, at least a portion of which is included in said road map data within said range thus selected; wherein:

said bird's-eye-view map display data preparation device prepares said bird's-eye-view map display data based upon data obtained by converting positional coordinates of nodes belonging to said polygon or link that has been selected to positional coordinates on a bird's-eye-view map using function tables.

12. A map display apparatus according to claim 10, further comprising:

an outside range node extraction device that extracts nodes belonging to said polygon or link selected by said graphic selection device, which are outside said range selected by said road map data selection device; and a node position correction device that corrects positional coordinates of said nodes thus extracted to predefined positions within said range selected by said road map data selection device.

13. A navigation system for vehicles comprising:

a read device that reads planimetric map data from a recording medium that stores said planimetric map data of a road map;

a current position detection device that detects a current position of a vehicle;

a storage device that stores function tables for converting positional coordinates of nodes included in a road map area around said current position thus detected to positional coordinates of nodes on a bird's-eye-view map obtained by looking down upon said road map in a predefined direction, at a predefined look-down angle and with a predefined aspect angle from a viewpoint set above a vicinity of said detected current position, said function table being prepared in advance via calculations; and a bird's-eye-view map display data preparation device that reads out data related to coordinate positions of nodes on said bird's-eye-view map by operating said function tables with coordinate positions of nodes on said road map and prepares bird's-eye-view map display data for displaying said bird's-eye-view map on a monitor based upon the data thus read out.

14. A recording medium for a navigation system, set in a processing apparatus connected to a storage device that stores in memory planimetric map data of a road map and a current position detection device for detecting a current position of a vehicle, storing a program that executes:

a procedure through which said planimetric map data are read from said storage device;

a procedure through which a current position is read from said current position detection device;

a procedure through which function tables are operated, said function tables including data for converting positional coordinates of nodes contained in said road map area in a vicinity of a detected current position to positional coordinates of nodes on a bird's-eye-view map obtained by looking down upon said road map in a predefined direction, at a predefined look-down angle and with a predefined aspect angle from a viewpoint set above a vicinity of said detected current position, said function table being prepared in advance via calculations; and a procedure through which data related to coordinate positions of nodes on said bird's-eye-view map are read out by operating said function tables with positional coordinates of nodes on said road map and bird's-eye-view map display data for displaying said bird's-eye-view map on a monitor are prepared based upon said data thus read out.

15. A map display apparatus according to claim 1, wherein said conversion table includes a result of calculation with an expression including at least one variable, and the result of calculation with the expression is obtained by referring to said conversion table with the variable as a parameter instead of calculating with the expression.

16. A map display apparatus according to claim 15, wherein said at least one variable is included in a divisor of the expression.

17. A map display apparatus according to claim 5, wherein said function table includes a result of calculation with an expression including at least one variable, and the result of calculation with the expression is obtained by referring to said function table with the variable as a parameter instead of calculating with the expression.

18. A map display apparatus according to claim 17, wherein said at least one variable is included in a divisor of the expression.

19. A map display apparatus according to claim 14, wherein said function table includes a result of calculation with an expression including at least one variable, and the result of calculation with the expression is obtained by referring to said function table with the variable as a parameter instead of calculating with the expression.

20. A map display apparatus according to claim 19, wherein said at least one variable is included in a divisor of the expression.

21. A map display apparatus according to claim 13, wherein said conversion table includes a result of calculation with an expression including at least one variable, and the result of calculation with the expression is obtained by referring to said conversion table with the variable as a parameter instead of calculating with the expression.

22. A map display apparatus according to claim 21, wherein said at least one variable is included in a divisor of the expression.

\* \* \* \* \*